A. Wiswell.
Tailoring
No. 256.
Patented Jul. 11. 1837.
Sheet 1. 3 Sheets.
Plate 1.
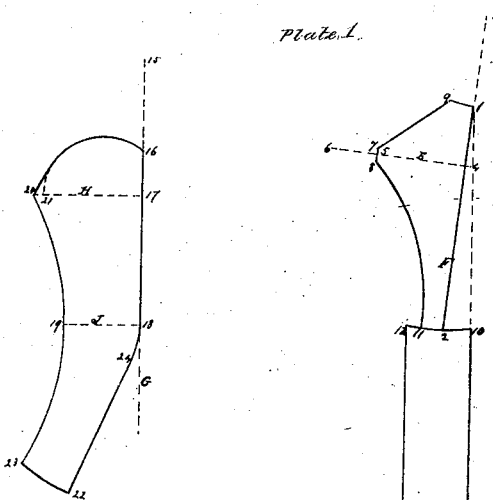
Plate II
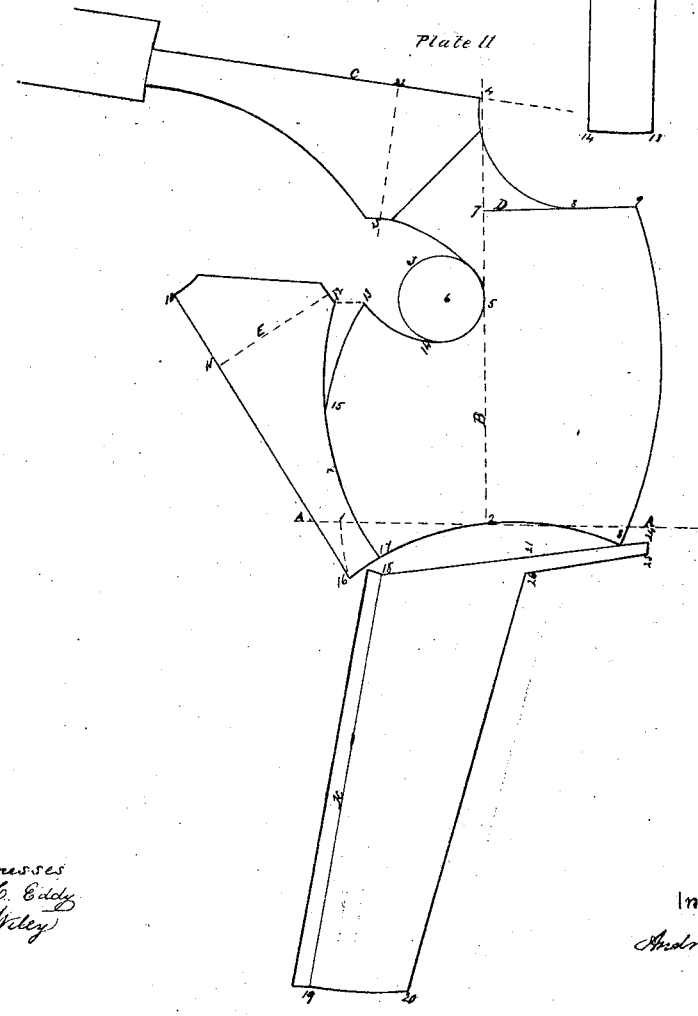
Witnesses
R. H. Eddy
W. Wiley
Inventor
Andrew Wiswell A. Wiswell.
Tailoring.
Nº 256. Patented Jul. 11. 1837.
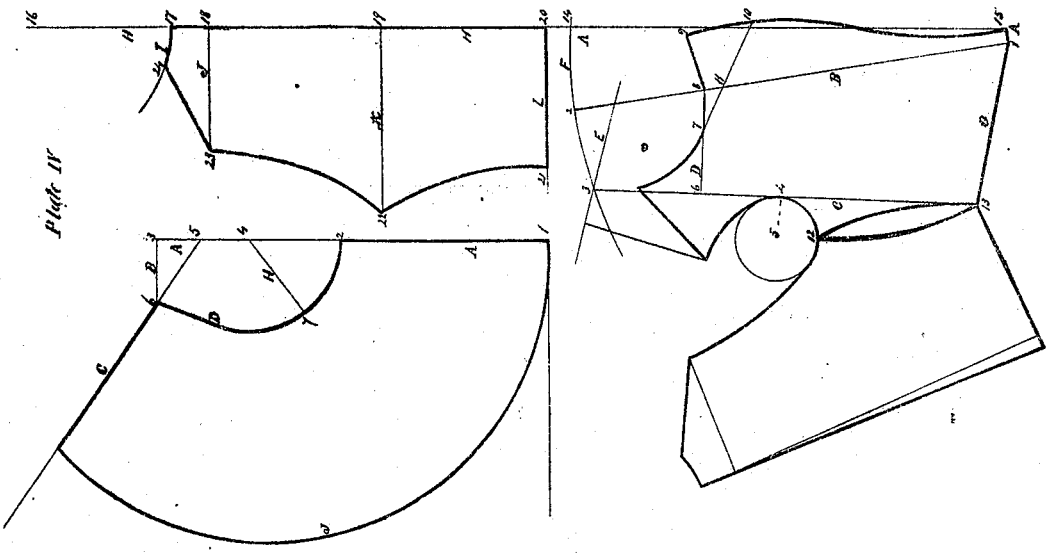
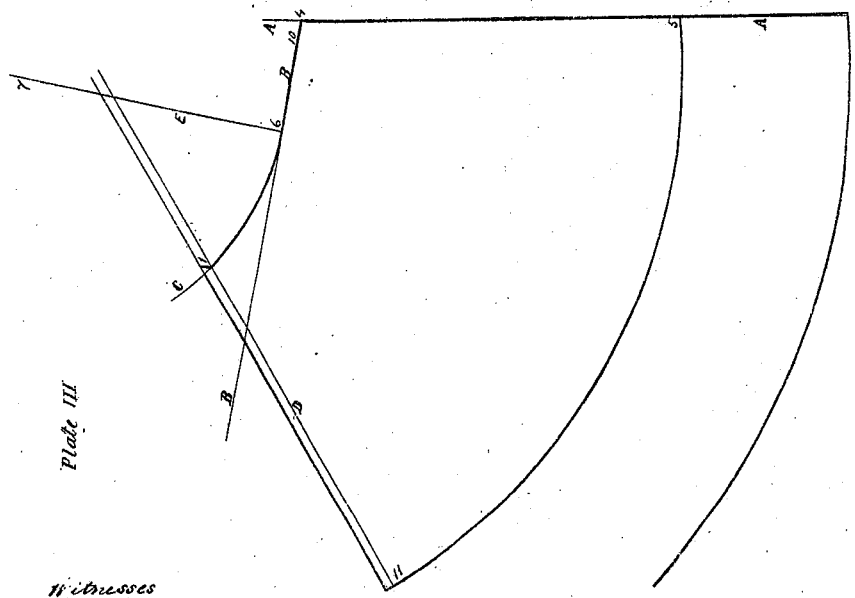
Witnesses
R. H. Eddy
W. Wiley
Inventor
Andrew Wiswell A. Wiswell.
Tailoring.
No 256.    Patented Jul 11, 1837
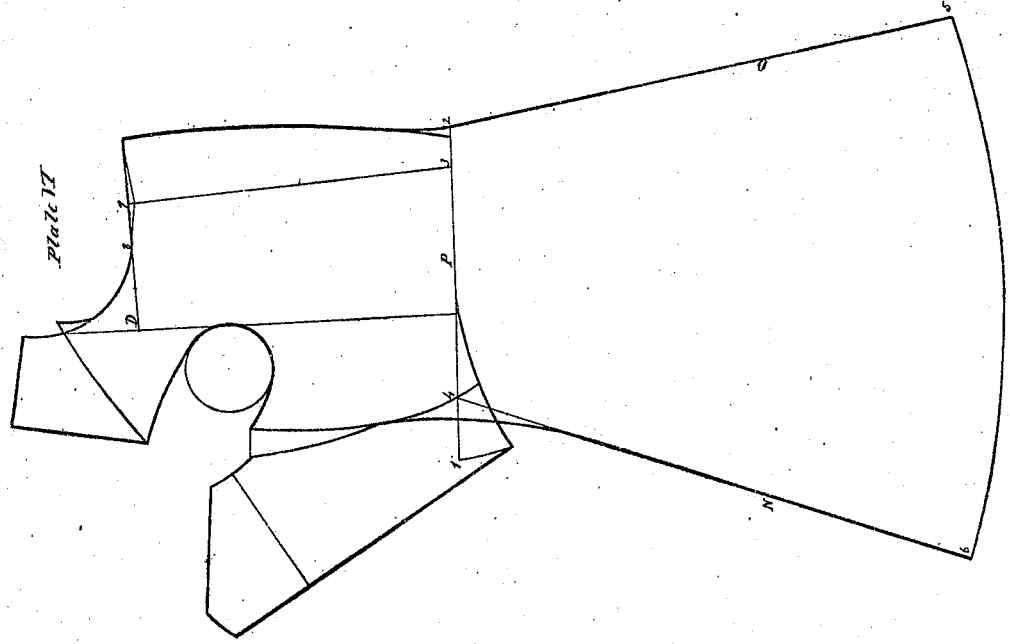
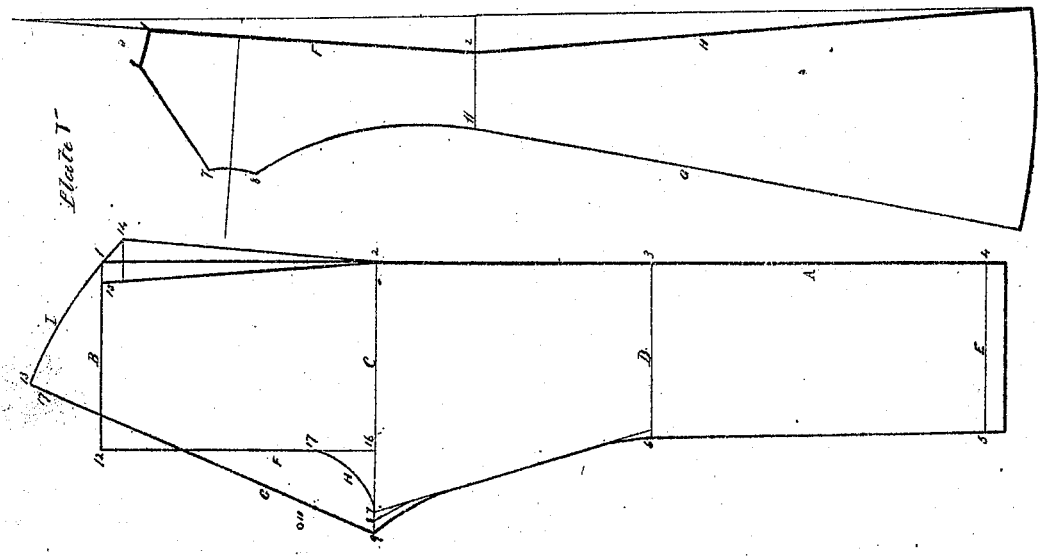
Witnesses
R. H. Eddy
W. Wiley
Inventor
Andrew Wiswell

UNITED STATES PATENT OFFICE.

ANDREW WISWELL, OF EXETER, NEW HAMPSHIRE.

SYSTEM OF CUTTING GARMENTS.

Specification of Letters Patent No. 256, dated July 11, 1837.

*To all whom it may concern:*

Be it known that I, ANDREW WISWELL, of Exeter, Rockingham county, State of New Hampshire, have invented, made, and applied to use new and useful improvements in taking measures for different garments and applying the same to the cloth to form the figures or patterns of a coat or other article of dress to which the same is applicable.
The arrangement and use of these improvements, the principle thereof, and the several modes in which I have contemplated the application of that principle or character by which it may be distinguished from other inventions, together with what I claim as my inventions and discoveries, I have fully set forth and described in the following specification and annexed drawings.

*Directions for taking measures.*—In order to take the measure of a person for a dress coat, it is first necessary to ascertain the size around the waist, under his coat, which should be entered on the measure book, say fourteen inches or any other number as the case may be. The person is now to button his coat and stand in a natural and easy position. The next operation is to obtain a horizontal line or level around the waist just above the hip bone; and to do this, make a horizontal mark with chalk at the above place. Place the end of the measure on the mark with the left hand and extend the tape with the right to the floor. Now get the same distance from the floor, to the lapel seam, and also lay off the same distance from the floor to the back seam, in the same manner. Thus we obtain four points of a horizontal line passing around the waist, which we denominate the base from which all the balance measures start from or run to. Place the end of tape on the mark on back seam and carry it forward half of waist measure, say seven inches, and make a mark on horizontal mark on hip, thus obtaining the hip point. Now commence taking the balance measures, by placing the end of tape at top of back seam, holding it there until the three following measures are obtained. Extend the tape over the shoulder, down the breast to the mark on the lapel seam, say twenty one and one half inches. This I call the first measure. Bring it down, close to the shoulder, to the hip point say twenty inches, which gives the second measure. For the third measure, carry it close around and under the arm to the top of back seam, say twenty six inches. Now place the end of measure between the shoulders, on back seam and carry it over the shoulder around under the arm to the point of starting, say twenty six inches. This is the fourth measure. For the fifth measure place the end of tape at the top of back seam and extend it down over the point of shoulder blade to the hip point say eighteen and one half inches. The above are distinguished by the appellation of balance measures, because they balance the coat to the form of every person and will give the points with more exactness than any other system now in use. You will now place the end of tape at top of back seam and extend it down to the mark on the back seam at waist, say sixteen inches, and if fashion or fancy requires the waist to be longer you will increase the same at pleasure and enter the length in your measure book. Now extend the measure down the full length say thirty eight inches or any other length as the case may be. Then place the end of measure on the back seam between the shoulders, (having the arm raised level with the shoulder and lower part of the arm bent inward to a right angle,) and extend it to elbow, say nineteen inches and down to the first joint of little finger, say thirty two inches. Now measure around the arm as close to the body as possible, which should be taken quite tight, say sixteen inches. Also take the size around the elbow and hand.

The above measures are all that is necessary for body garments in general, with these exceptions, that for a surtout add one inch to the waist measure, for a wrapper, two inches. For a vest take the breast measure. When the measures for pantaloons are required, place the end of tape at the top of hip bone and extend it down to a crease under the fleshy part of seat and opposite the crotch, also to the knee and from thence the full length and enter them in your book. This done measure around the waist hips and knee. It is also convenient to place the end of the tape at the hip point and extend the same around and between the legs to the hip point. This measure should be taken on both sides to obtain their difference in order to make them set well at the junction of the legs in front. The above measures being so common and all that are necessary for pantaloons, need no further explanation, except that around the hips, which should be taken around the most fleshy part of the seat.

When the third and fourth measures for a coat are alike only one may be entered in the book as the third in that case answers all purposes. The breast measure is not taken except when vest measure alone is wanted.

*Plate 1—Directions for drawing the back of a dress coat.*—First lay off the length of the back by measure from 1 to 10 and 13. Set off from 10 to 2 two inches and draw the straight line 2, 1, 3. Lay off the distance from 1 to 3 one fourth of the third measure also the distance from 1 to 4, one-sixth of third measure on line F. Place the square on line F and draw line E from 4 to 5 one-fourth of fourth measure—and also lay off 5 to 6 one-eight of fourth measure. From 6 as a center with a radius equal to the distance between the points 5 and 6 describe the curve 7, 5, 8. Also on 3 as a center with the radius 3, 1 describe a curve and set off a distance thereon from 1 to 9 one-sixteenth of fourth measure; and also from the same center describe a curve through the point 2 and set off the same distance from 2 to 11 as from 1 to 9. Set off a distance of one inch between the points 7 and 8, and between 7 and 9 draw a straight line. Describe a curve from 8 to 11 by radius equal to length of waist. From point 9 as a center describe curves through 10 to 12 and 13 to 14. Make the distance from 11 to 12 equal to one inch, and from 13 to 14, one-third of waist measure.

*Directions for drawing sleeve.*—On a straight line G set off from 15 to 18 the length of measure to elbow. On 18 lay off toward 22 the distance from elbow to hand. From 15 to 16 set off one-fourth of third measure and from 16 to 17 one-eighth of the same. Lay on the square at 17 and draw the line H at right angles to the line G, also through point 18 draw the line I perpendicular to G. On lines H and I set off half the shoulder and elbow measures from 18 to 19 and 17 to 20. From 20 to 21 set off three-fourths of an inch. Find a suitable center on line H and describe a curve from 16 to 21. With a radius equal to the distance from 15 to 18 strike a curve through the points 20, and 19, which continue to 23 in order to obtain the forearm seam. Form the elbow by describing a curve through 18 with a center 19. Opposite the point 22 as found before lay off a distance from 23 in direction of 22 by measure and complete the sleeve by drawing the lines from 22 to 23 and 22 to 24. This is a rule which may be applied in all cases, answering equally as well for a grown person as a child, and this sleeve together with the back accommodates itself to every variation of fashion without any alteration in the principle of the system.

If the back is required to be one two or three inches narrower than its present width, the point 16 should be carried up one two or three inches toward 15 and the curve of the top of the sleeve start from this point and be struck as before. All the divisions applied to heights are from the third measure and all those that apply to widths are from the fourth measure. When these measures differ the above rule is applied—but when they are alike either will answer all purposes.

*Plate 2—Directions for drawing forepart.*—On commencing a drawing of the forepart—lay down the length of second measure diminished by the width of back at top and draw the straight line A, A, which is called the base line—because all the balance measures run from or to it, and it is the groundwork of the system. Now lay off the size of waist commencing at an assumed point 1. From 1 to 2 set off half of waist or 7 inches and from 2 to 3 the other half. Through the point 1 describe the curve from 1 to 16 from point 2 as a center. Find point 4 by first measure laid off from point 3 and also by second measure at or from point 2. Having ascertained point 4 draw the line B, and set off from 4 to 5 three-eighths of third measure. Describe a curve 5, 6 from point 4 as a center and lay off the distance 5 to 6 one-twelfth of third measure and from line B to 14 the same. Place the vertex or angle of the square at point 4 and the edge of the long arm against point 14, and draw the line C by short arm of the square. At point 7 at a distance from point 5 one-sixth of third measure, draw the line D perpendicular to line B. Lay off from 7 to 8 one sixth of third measure and from 8 to 9 one-eighth of third measure. Now find a center on line C and draw a curve from 4 to 8. The point 8 is the place for break of collar on dress coats. In a line passing through points 23 and 13 find a center to strike the curve from 23 to circle J to form the upper part of the arm hole. Lay the back on line C and form the shoulder as represented in the drawing, first forming the scye by the circle J. Sweep a curve at 10 by fifth measure from point 2—and another at 11 by fourth measure from point 5. Set off the back approximately through points 10, 11 and 16, and sweep from 12 to 13 by point 16. Point 15 is found on a line from 10 to 2, and point 13 by setting off one-half of sleeve head measure from point 5. Now sweep from 13 to 15 by a distance that will not cross the side seam of back, and from 13 to 14 by a center found on the circle J forming the upper part of scye and shoulder point as seen in the drawing. Now find the point 17 by the back and describe a curve from 2 to 17 by a distance from 2 to 16—also a curve between points 9 and 3 by a distance or radius equal to twice their distance apart. This completes the forepart.

*Directions for drawing skirt.*—Draw the line K from 17 to 19 in a suitable direction, at a distance of one inch from the edge of the cloth, and set off thereon the length of back skirt. Now place the 2 inch mark of the long arm of the square and the 7 inch mark of the short arm on line K, having the long arm touch point 3. This gives the spring of skirt. Lay off from 19 to 20 one third of waist and from 18 to 21 one half of waist. Set off from 18 to 24 one and one half inches more than the distance from 3 to 17. From 24 set down the width of lapel 24 to 25 and draw line 25 to 26 parallel to line 18 to 24. Draw line 20 to 26, or form the skirt to fashion or fancy.

*Plate 3—Directions for drawing frock coat or surtout.*—The fore part and back of the frock coat is the same as that of a dress coat; the surtout the same except the size around the waist should be one inch longer and the point 4 (see figure of Plate 2) should be carried up one inch more and the shoulder formed accordingly. To draw the skirt of frock, you will first draw the line A A, Plate 3, and with the back get the length from 4 to 5. Lay one inch mark of the short arm of the square and the six inch point of the long arm on line A, drawing the line B by short arm of the square. Lay off the distance from 4 to 10 by width of lapel, and from 10 to 6 one third of the waist measure. Set off from 6 to 7 on a line perpendicular to line B, the waist measure. On point 7 as a center describe curve C and set off the proper distance to point 1. To obtain the spring of skirt place the two inch mark of the short arm of the square on point 1, and the 4 inch mark of the long arm of the square against line C between 1 and 6, and draw the line D by the short arm. Set off the length from 1 to 11, by length of back skirt, and describe the curve of bottom of skirt by a point as a center somewhere in the line 11 and 1, produced. By the same rules you may draw the skirt of a surtout if you desire to give it the same spring and fullness. If more fullness is required shorten the distance on line E from 6 to 7; if less extend the same, and in laying off the spring of the skirt always place the 2 inch mark on the edge of the short arm of the square on point 1, with the long arm toward 6, and move the long arm up or down as you want less spring. It is believed that the spring represented in the drawing viz., 2 inches by 4, is sufficient for any coat, but if any alteration is deemed advisable, it is only necessary to make such a number say, 5, 6 or 7, of the edge of square, correspond with the line C.

The above method of drawing the frock and surtout skirt, combines simplicity and correctness, and surpasses any other mode now in use. The skirt is always made to conform to the fore part, so as not to gape open in front or behind or hang over too much.

*Plate 4—Directions for drawing vest.*—First strike a line A, and for a rolling collar or double breast set off the point 1, one and a half inches from point 15. On point 1 as a center with first measure as a radius, describe curve F from 3 to 14. Set off from 14 to 2 one sixth of third measure and the same also from 2 to 3. Lay off from 3 to 13 second measure, and intersect the curve by half of waist measure laid off from point 1. Now draw the lines B, C, G. Set off from 3 to 4 three eighths of third measure. On point 3 as a center describe the arc, 4, 5 through 4, and make the distance between 4 and 5 equal to one twelfth of third measure. Place the vertex of the square on point 3, and the edge of the long arm against point 5 and draw the line E by the short arm. Make the distance from 4 to 6 one sixth of third measure. Now draw the line D perpendicular to C and set off from 6 to 7 one eighth of third measure. Sweep from 3 to 7 by a center somewhere in line E produced. Set down from 8 to 11 one inch on line B. We will now proceed to describe the manner of drawing the back. First draw two lines H and L perpendicular to each other and set off on line E from 20 to 21, one half of waist measure, from 21 to 17 the fifth measure, from 17 to 16 one fourth of third measure, from 17 to 18 one twelfth of third measure, and from 20 to 19 the distance from 12 to 13. Now draw the line K from 19 to 22, also J from 18 to 23. Through point 17 sweep the arc 17 to 24 with a radius of a twelfth of third measure. Make the distance from 18 to 23 one fourth of fourth measure from 19 to 22 three eighths of the same. Sweep the side and shoulder seams by radii equal to twice their lengths. If the vest is to be single breasted the line B should be within one inch of line A and parallel with it. These operations complete the vest. The same measures are taken for a vest as for a coat. The great advantage of this method of drawing the vest, consists in balancing the garment to every form, by the first, second and fifth measures. The third measure fits the arm scye with neatness and ease to every person and gives ample scope for the variations of fashion and fancy without the least alteration of the system. The first and second measures lengthen for the straight person while the fifth and length of waist shorten. For the round shouldered or stooping man the latter lengthen and the former shorten.

*Directions for drawing a cape.*—First draw the straight line A. From 1 to 2 the length of the cape is increased from its length at back and may be set off at pleasure. From 2 to 3 lay off three-fourths of neck measure (one half the measure around a person's neck we call the neck measure) from 3 to 4 one-half the distance from 2 to 3 and from 4 to 5 half the distance from 3 to 4. From 3 draw the line B at right angles to the line A and set off from 3 to 6 one-eighth of neck measure. On 4 as a center with a radius from 4 to 2 describe curve D, and draw through 6 a tangent 6 to D. Lay off from 2 to 7 one-sixth of neck measure and draw the line H from 4 to 7. Draw the straight line C through the points 5 and 6 and sweep the curve J by a point H as a center somewhere in line H. If it is desirable that the cape should be of the same width all around curve J may be struck from point 4 but if deeper at the sides and shorter in front move the point H from 4 in proportion as you wish to vary the form.

*Plate 5—Directions for drawing the wrapper back.*—For drawing the wrapper, add two inches to the waist and shoulder measure. Commence the back in the same manner as the dress coat the back being one-fourth of the waist measure from 2 to 11 and from 7 to 8 two inches. Make the distance 1 to 9 one-twelfth of fourth measure and draw the line G by a line through the points 9 and 11 produced, also the line H by 9 and 2 produced.

*Directions for drawing pantaloons.*—First draw the line A and lay off the lengths by measure. Then draw the lines B, C, D E. Now set off from 2 to 16 half size of hips, from 16 to 17 one-sixth of the same. From 7 to 8 one-half an inch; from 8 to 9 one-half an inch. Lay short arm of square on line C, and draw the line F from 16 to 12. Set off from 12 to 15 half of waist measure; from 16 to 11 the same distance as from 16 to 8. Now sweep from 11 to 8 by 10 as a center and form line H. Make the distance 3 to 6 and 4 to 5 correspond with the measures. To form the seat bring out point 14 as much as point 15 goes in from 1. For tight pantaloons find the line G by half of waist measure from 14. Now draw the line G from 9 to 13. To find the distance from 9 to 17, place the short arm of the square on line G and the long arm on 14. The vertex of the square will be the point 17 sought. Lay upward 1 inch on G and mark the point 13. Now with the tape and a piece of chalk in the right hand, extend the measure from point 13 down on line G until you find a center to sweep a curve from 13 to 14. In this way pantaloons can be cut so as to have the seams run down by the side of the leg and not twist on the knee and instep, nor be too loose in the seat when cut for a corpulent person.

*Plate 6—Directions for drawing forepart of wrapper.*—The fore part of wrapper is drawn the same as fore part of dress coat, except the distance from 9 to 8 is one-twelfth of third measure and from 2 to 3 one-fourth of waist measure. To establish line O draw a straight line through the points 9 and 2, which continue to 5; also to find line N, place the 2 inch mark of the short arm of the square on 4, and the 6 inch mark of long arm on line P, and draw line N by short arm of the square. From 1 to 3 is set off the size of waist. The remainder will be sufficiently understood by the drawing.

*Mode of entering the measure in the order book.*—Waist, (14;) 1st, (21½;) 2nd, (20;) 3d, 4th, (26 26;) 5th, (18½;) lengths, (16, 38;) sleeve, (19, 32;) size of sleeve, (8, 6, 4½.)

*The square.*—The square that I use with my system is set off and divided expressly for third and fourth measures, which differ from eighteen to thirty-four inches. The long arm of the square is divided into inches, and also divided into halves, fourths, eighths of the above measures. The short arms also in inches, and into thirds, sixths and twelfths of the above measures.

I claim in the above system of measuring and plotting—

1. Taking the level around the waist, the variations of straight and stooping men being above this line.

2. The mode of measuring by the first, second and fifth measures, the first and second giving the true place for the upper shoulder point, as is represented in the drawings, no other system having done the same before. The fifth measure balances the coat and brings it in at the waist. The third and fourth measure, by being divided, form the upper part of back and forepart as will be seen by their application on the drawings.

3. In measuring for pantaloons I claim taking the measure around the fleshy part or most corpulent portion of the seat.

4. I also claim the combination of the above measures as herein described, forming a system for cutting different garments.

In testimony that the above is a true description of my said inventions and improvements I have hereunto set my hand this third day of April, in the year of our Lord eighteen hundred and thirty-seven.

ANDREW WISWELL.

Witnesses:
  R. H. EDDY,
  W. WILEY.